United States Patent
Morishige

(10) Patent No.: US 11,295,712 B2
(45) Date of Patent: Apr. 5, 2022

(54) VIBRATION DEVICE, DRIVING METHOD FOR VIBRATION DEVICE, PROGRAM, AND RECORDING MEDIUM

(71) Applicant: PIONEER CORPORATION, Tokyo (JP)

(72) Inventor: Takashi Morishige, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 17/059,185

(22) PCT Filed: May 23, 2019

(86) PCT No.: PCT/JP2019/020408
§ 371 (c)(1),
(2) Date: Nov. 25, 2020

(87) PCT Pub. No.: WO2019/230545
PCT Pub. Date: Dec. 5, 2019

(65) Prior Publication Data
US 2021/0201861 A1     Jul. 1, 2021

(30) Foreign Application Priority Data
May 30, 2018   (JP) .............................. JP2018-103588

(51) Int. Cl.
*B60Q 5/00*       (2006.01)
*G10G 1/00*       (2006.01)
(Continued)

(52) U.S. Cl.
CPC .............. *G10G 1/00* (2013.01); *A47C 7/727* (2018.08); *B60Q 9/00* (2013.01); *B60R 11/0217* (2013.01)

(58) Field of Classification Search
CPC ........ B25J 13/085; B25J 13/082; B25J 15/08; B25J 19/02; B62D 57/032; H02B 13/045;
(Continued)

(56) References Cited

U.S. PATENT DOCUMENTS 5,748,182 A * 5/1998 Ohashi ................... G03G 15/36
                                                                       345/173
7,256,686 B2 * 8/2007 Koutsky .............. B60N 2/0244
                                                                        340/438
(Continued)

FOREIGN PATENT DOCUMENTS

JP   2001086581 A   3/2001
JP   2003102086 A   4/2003
(Continued)

OTHER PUBLICATIONS

International Search Report for related JP. App. No. PCT/JP2019/020408 dated Jul. 2, 2019. English translation provided; 5 pages.
(Continued)

*Primary Examiner* — Daniel Previl
(74) *Attorney, Agent, or Firm* — Procopio, Cory, Hargreaves & Savitch LLP

(57) ABSTRACT

A vibration device comprising: a first vibration unit that vibrates to vibrate a first contact portion of an object, the object including a first contact portion and a second contact portion, the first contact portion being in contact with a first part of a body of an object person, the second contact portion being in contact with a second part different from the first part of the body of the object person; and a second vibration unit that vibrates to vibrate the second contact portion, wherein the first vibration unit and the second vibration unit vibrate such that each of the first contact portion and the second contact portion vibrates in response to an acoustic
(Continued)

signal, and the second contact portion vibrates with a delay from the first contact portion.

14 Claims, 6 Drawing Sheets

(51) Int. Cl.
*A47C 7/72* (2006.01)
*B60Q 9/00* (2006.01)
*B60R 11/02* (2006.01)

(58) Field of Classification Search
CPC ...... H02B 13/035; H02G 5/065; H02G 5/066; A61M 5/422; A61N 1/0456; A61N 1/0476; A61N 1/0492; A61N 1/36021; G01L 1/005; G01L 1/16; G01L 5/00; G01L 5/226; G01L 1/162; H01B 17/62; H01B 19/04; H01H 9/02; H01H 9/48; Y10S 73/04; B06B 1/0644; B06B 1/16; B23K 11/163; B24B 41/042; B24B 9/14; D01H 7/862; E04G 2021/208; E04G 21/22; E21B 47/022; F02N 11/08; G01B 17/02; G01F 23/2966; G01F 23/2967; G01M 1/36; G01S 3/42; G03G 15/36; G05D 5/03; G06F 3/0433; G09F 19/10; G10K 1/067; H01F 7/088; H01F 7/1205; H01F 7/1607; H02K 11/0094; H02K 11/30; H02K 2211/03; H02K 3/28; H02K 5/04; H02K 7/063; H02K 7/08; H02K 7/083; H02K 7/09; H02M 7/62; H02P 1/46; H03H 9/17; H03H 9/30; H04N 1/3873; H04R 17/005; Y10T 137/0329; Y10T 137/0335; Y10T 137/2509; Y10T 74/2111
USPC ......... 340/438, 573.1, 573.7, 576, 665, 667, 340/689, 425.5, 5.53, 666, 668, 457.1, 340/439
See application file for complete search history.

(56) References Cited

U.S. PATENT DOCUMENTS

| | | | |
|---|---|---|---|
| 2002/0032395 A1* | 3/2002 | Klingler | A61H 15/0078 601/115 |
| 2006/0080004 A1* | 4/2006 | Cheok | G01C 23/005 701/1 |
| 2006/0155175 A1* | 7/2006 | Ogino | A61B 5/113 600/301 |
| 2008/0281238 A1* | 11/2008 | Oohashi | A61H 39/007 601/46 |
| 2009/0030619 A1* | 1/2009 | Kameyama | G06F 16/636 702/19 |
| 2009/0099721 A1 | 4/2009 | Imai et al. | |
| 2014/0015293 A1* | 1/2014 | Pellenz | A61H 23/04 297/217.3 |
| 2017/0245070 A1 | 8/2017 | Inagaki et al. | |
| 2018/0022277 A1 | 1/2018 | Tayama | |
| 2018/0326902 A1 | 11/2018 | Hashimoto et al. | |

FOREIGN PATENT DOCUMENTS

| | | |
|---|---|---|
| JP | 2007055321 A | 3/2007 |
| JP | 2007331519 A | 12/2007 |
| JP | 2008077631 A | 4/2008 |
| JP | 2008092122 A | 4/2008 |
| JP | 2009031946 A | 2/2009 |
| JP | 4600948 B | 12/2010 |
| WO | 2016027366 A1 | 2/2016 |
| WO | 2016132892 A1 | 8/2016 |
| WO | 2017090355 A1 | 6/2017 |

OTHER PUBLICATIONS

Office Action dated Oct. 5, 2021 from counterpart Japanese Patent Application No. 2020-522133, 10 pages.

* cited by examiner

VIBRATION DEVICE, DRIVING METHOD FOR VIBRATION DEVICE, PROGRAM, AND RECORDING MEDIUM

CROSS-REFERENCE TO RELATED APPLICATIONS

This application is a U.S. National Stage entry of PCT Application No. PCT/JP2019/020408, filed on May 23, 2019, which claims priority to JP Application No. 2018-103588, filed May 30, 2018. The contents of the foregoing are incorporated by reference.

TECHNICAL FIELD

The present invention relates to a vibration device that vibrates responding to sound, a driving method for the vibration device, a program, and a recording medium.

BACKGROUND ART

Conventionally, there has been known an acoustic system configured to provide a high-quality music (sound field) to an audience by adjusting characteristics of audio output from a plurality of speakers. For example, Patent Document 1 discloses an in-vehicle sound reproduction device configured to adjust respective ranges of sounds output from a plurality of speakers. Additionally, Patent Document 1 discloses an in-vehicle sound reproduction device configured to cause an object person to feel music by providing the body of the object person with vibration in addition to the audio output.
Patent Document 1: Japanese Patent No. 4600948

DISCLOSURE OF THE INVENTION

Problems to be Solved by the Invention

Considering providing a high-quality and realistic music, an acoustic system that provides vibration to a body in time with the music preferably goes beyond simply providing an audience with sensory vibration linked to the music to provide a vibration perceived as a part of the music.

Alternatively, for example, when the acoustic system is mounted on a moving body, such as a vehicle, the acoustic system is preferably configured to provide an occupant with a vibration that provides various kinds of information while providing a high-quality and realistic sound.

The present invention has been made in consideration of the above-described points, and an object of which is to provide a vibration device capable of providing a high-quality and realistic sound, a control method for the vibration device, a program and a recording medium. Alternatively, an object of the present invention is to provide a vibration device capable of transmitting various kinds of information, a control method for the vibration device, a program, and a recording medium.

Solutions to the Problems

The invention according to claim 1 is a first vibration unit that vibrates to vibrate a first contact portion of an object, the object including a first contact portion and a second contact portion, the first contact portion being in contact with a first part of a body of an object person, the second contact portion being in contact with a second part different from the first part of the body of the object person; and a second vibration unit that vibrates to vibrate the second contact portion, wherein the first vibration unit and the second vibration unit vibrate such that each of the first contact portion and the second contact portion vibrates in response to an acoustic signal, and the second contact portion vibrates with a delay from the first contact portion.

Further, the invention according to claim 11 is a driving method for a vibration device, wherein the vibration device includes a first vibration unit and a second vibration unit, the first vibration unit vibrating a first contact portion of an object, the second vibration unit vibrating a second contact portion, the object including a first contact portion and a second contact portion, the first contact portion being in contact with a first part of a body of an object person, the second contact portion being in contact with a second part different from the first part of the body of the object person, the method comprising driving the first vibration unit and the second vibration unit such that each of the first contact portion and the second contact portion vibrates in response to an acoustic signal, and the second contact portion vibrates with a delay from the first contact portion.

Further, the invention according to claim 12 is a program that causes a computer to function as a drive unit, wherein the drive unit drives a first vibration unit and a second vibration unit such that each of a first contact portion and a second contact portion vibrates in response to an acoustic signal and the second contact portion vibrates with a delay from the first contact portion, the first vibration unit provides a vibration to the first contact portion of an object and a second vibration unit provides a vibration to the second contact portion of the object, the object includes the first contact portion in contact with a first part of a body of an object person and the second contact portion in contact with a second part different from the first part of the body of the object person.

Further, the invention according to claim 13 is a recording medium that records the program according to claim 12.

DESCRIPTION OF PREFERRED EMBODIMENTS

The following describes embodiments of the present invention in detail.

Embodiment 1

Figure 1:
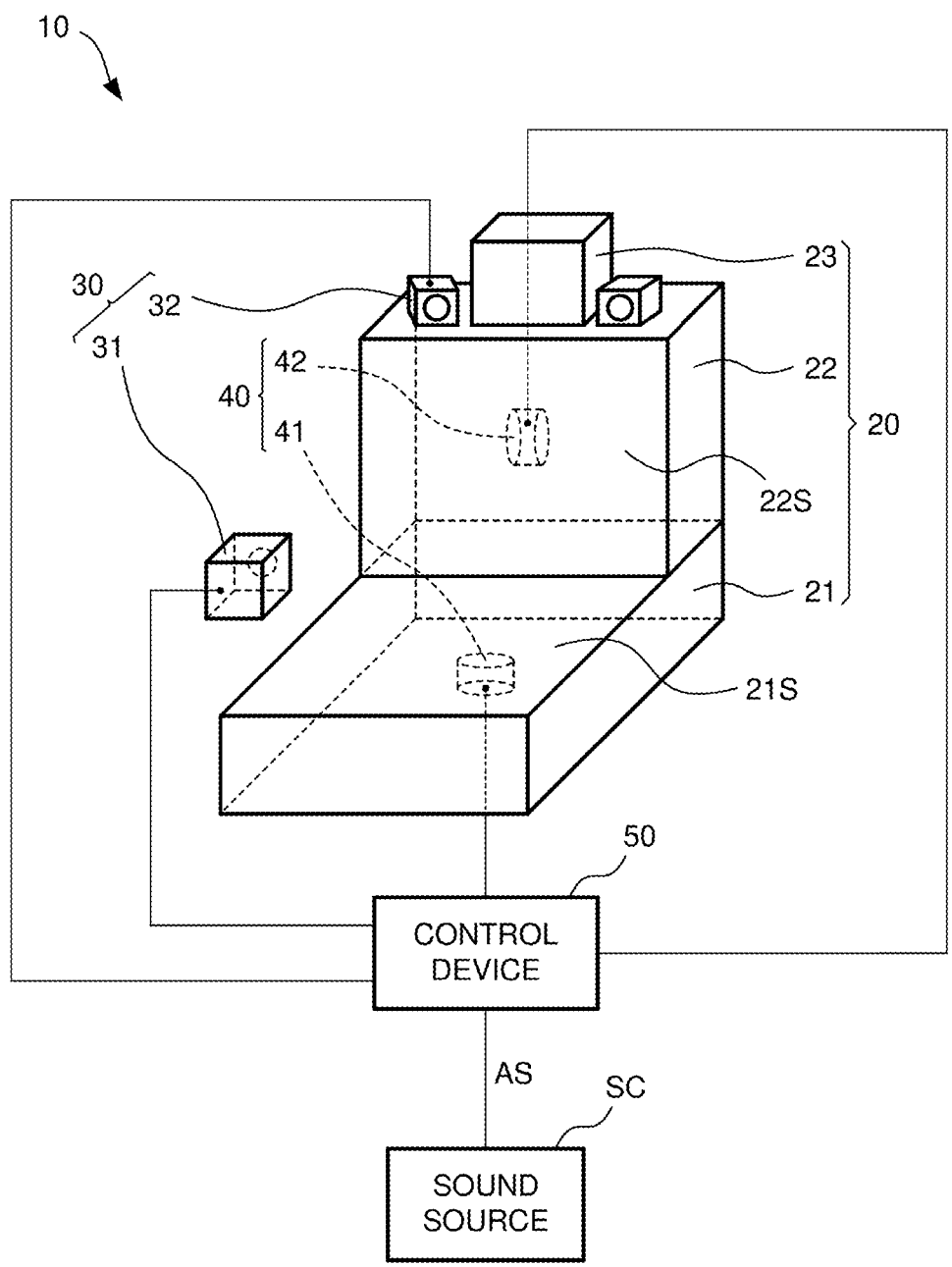
FIG. 1 is a drawing illustrating an overall configuration of an acoustic system according to Embodiment 1.

FIG. 1 is a schematic layout drawing of an acoustic system 10 according to Embodiment 1. Using FIG. 1, the acoustic system 10 will be described. The acoustic system 10 includes a seat 20 on which an object person sits, a sound output device 30 that performs a sound output, a vibration device 40 that transmits a vibration to the object person, and a control device 50 that controls them.

The acoustic system 10 acquires an acoustic signal AS that is an electric signal expressing a sound from a sound source SC. For example, the sound source SC includes a recording medium in which data for playing music is recorded, a device for reading the data from the recording medium, and the like. The acoustic system 10 outputs the sound by the sound output device 30 and vibrates the seat 20 by the vibration device 40 in response to the acoustic signal AS. Further, the control device 50 controls a sound output operation of the sound output device 30 and a vibration operation of the vibration device 40.

In this embodiment, the seat 20 includes a seat portion 21 configured to support the buttocks and thighs of the object person when the object person is seated on the seat 20, and a backrest portion (backrest, hereinafter referred to as a back portion) 22 configured to support the back and waist of the object person, and a head portion (headrest) 23 configured to support the head of the object person.

The seat 20 can support the object person in various kinds of aspects. The seat 20, for example, can be used by being secured to a fixed object, such as a seat in a movie theater, and can be used by being secured to a moving body, such as a seat in a vehicle. Further, the seat 20 can be used as a removable or portable type chair.

In this embodiment, the sound output device 30 includes a center speaker (first sound output unit) 31 arranged ahead of the seat 20 and the object person seared on the seat 20, and a headrest speaker (second sound output unit) 32 arranged near the head portion 23 of the seat 20. Each of the center speaker 31 and the headrest speaker 32 outputs sounds.

In this embodiment, the vibration device 40 includes a seat portion vibration unit (first vibration unit) 41 embedded in the seat portion 21 of the seat 20, and a back portion vibration unit (second vibration unit) 42 embedded in the back portion 22 of the seat 20. The seat portion vibration unit 41 vibrates a surface 21S of the seat portion 21 of the seat 20 that is in contact with the object person by vibrating itself. The back portion vibration unit 42 vibrates a surface 22S of the back portion 22 of the seat 20 that is in contact with the object person by vibrating itself. Note that the seat portion vibration unit 41 and the back portion vibration unit 42 may each include a plurality of vibrators.

Further, in this embodiment, based on the acoustic signal AS, the control device 50 drives each of the center speaker 31 and the headrest speaker 32 of the sound output device 30, and the seat portion vibration unit 41 and the back portion vibration unit 42 of the vibration device 40. The control device 50 generates a drive signal for driving the sound output device 30 and a drive signal for driving the vibration device 40 based on the acoustic signal AS. The control device 50 supplies these drive signals to the sound output device 30 and the vibration device 40.

Figure 2:
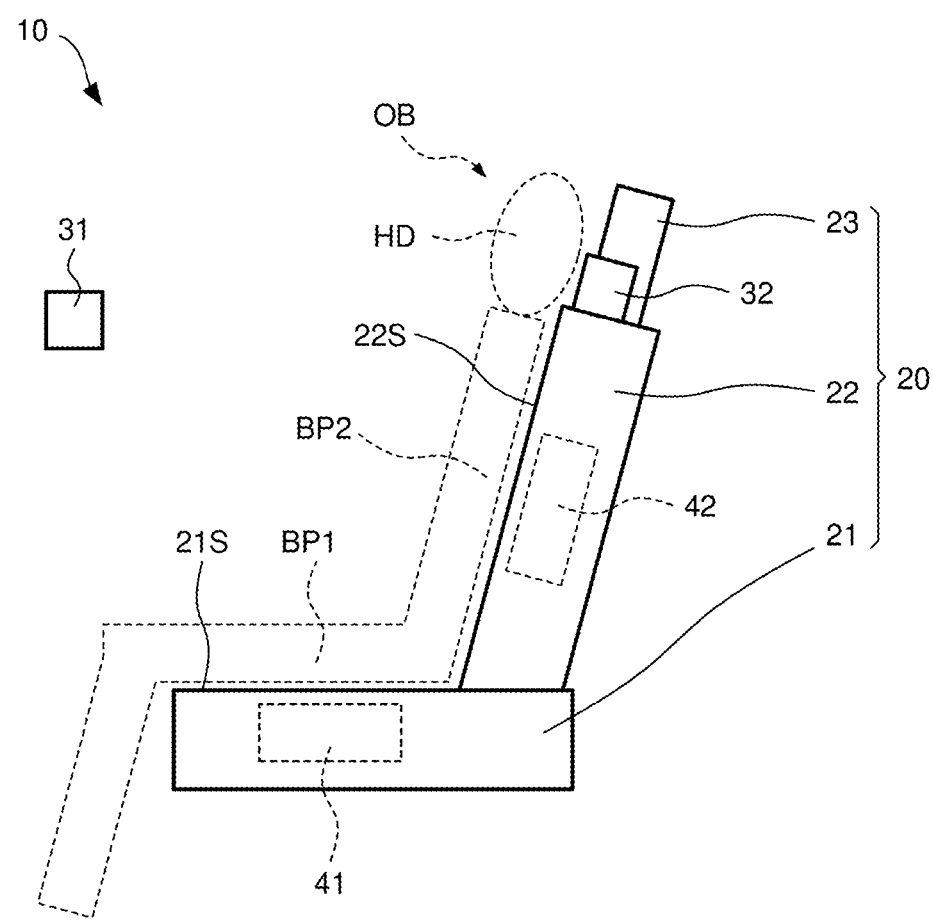
FIG. 2 is a drawing illustrating a positional relationship between the acoustic system and an object person according to Embodiment 1.

FIG. 2 is a side view of the seat 20 of the acoustic system 10. In FIG. 2, an object person OB seated on the seat 20 is indicated by a dashed line. Using FIG. 2, a positional relationship between the acoustic system 10 and the object person OB will be described.

In this embodiment, buttocks and thighs of the object person OB come into contact with the surface 21S of the seat portion 21 of the seat 20. Further, a back and a waist of the object person OB come into contact with the surface 22S of the back portion 22 of the seat 20.

In this description, a body part BP1 of the object person OB that comes in contact with the surface 21S of the seat portion 21 of the seat 20 is referred to as a first part in some cases. Further, the surface 21S of the seat portion 21 of the seat 20 is referred to as a first contact portion as a portion in contact with the first part BP1 in some cases.

Further, a body part BP2 of the object person OB that comes in contact with the surface 22S of the back portion 22 of the seat 20 is referred to as a second part in some cases. Further, the surface 22S of the back portion 22 of the seat 20 is referred to as a second contact portion as a portion in contact with the body part BP2 in some cases. In this embodiment, the second part BP2 is a body part of the object person OB positioned closer to a head HD of the object person OB than the first part BP.

Note that, the description that the first part BP1 of the object person OB and the first contact portion 21S of the seat 20 are in contact includes both a case where both directly contact one another and a case where both indirectly contact one another. Similarly, when it is described that the second part BP2 of the object person OB and the second contact portion 22S of the seat 20 are in contact, cases where both directly and indirectly contact are included. For example, in the case where the first part BP1 and the first contact portion 21S are in contact, a case where the first part BP1 and the first contact portion 21S are in contact via clothing of the object person OB, a case where the first part BP1 and the first contact portion 21S are in contact via a cover of the seat 20, and the like are included.

Meanwhile, each of the center speaker 31 and the headrest speaker 32 of the sound output device 30 is not in contact with the object person OB. The sound output device 30 can be said to be a device that generates sound waves traveling in a space toward the object person OB (that is, ears of the object person OB), and a device that provides a sense of hearing to the object person OB.

Figure 3:
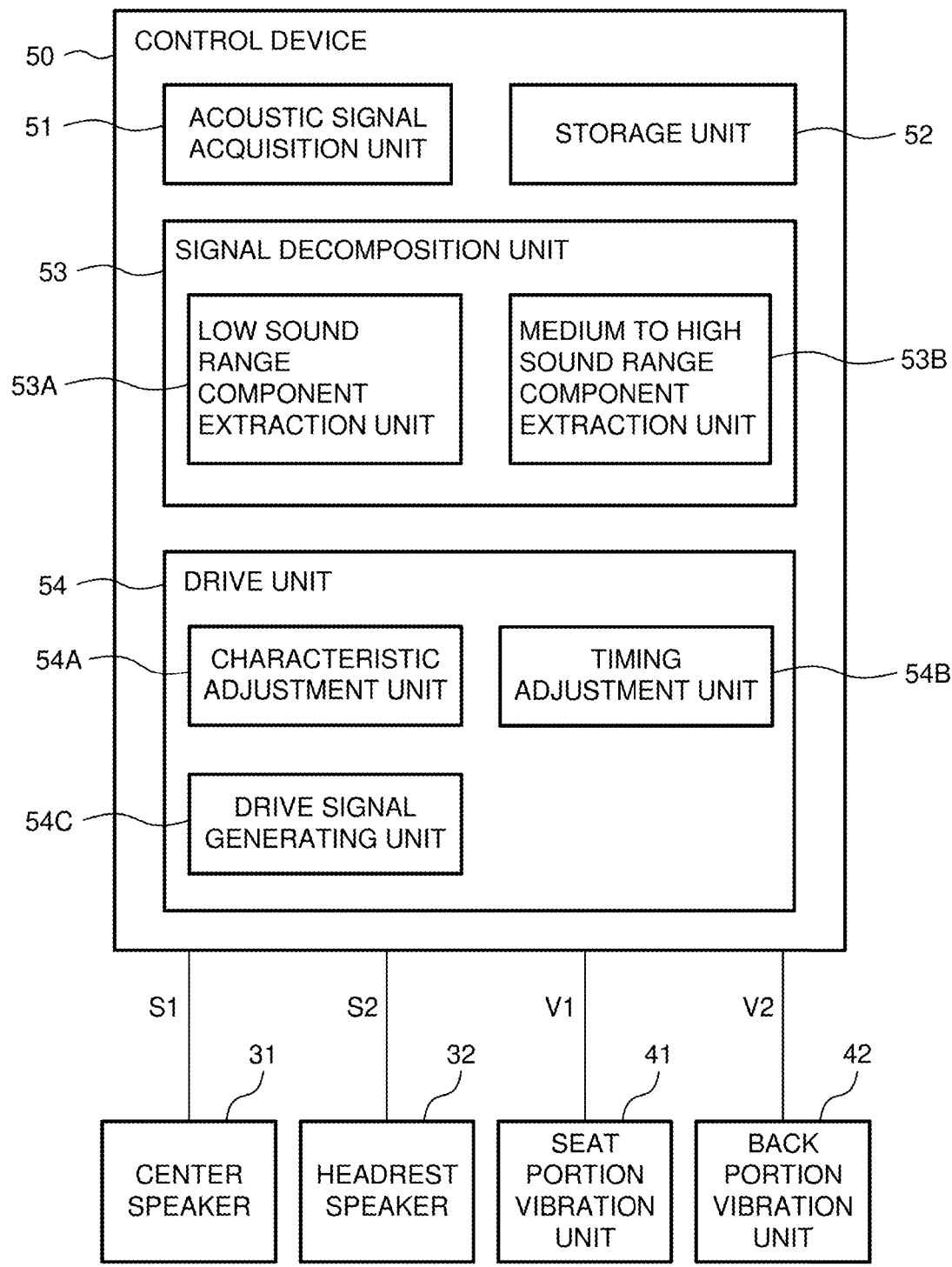
FIG. 3 is a block diagram of a control device of the acoustic system according to Embodiment 1.

FIG. 3 is a block diagram of the control device 50 in the acoustic system 10. In this embodiment, the control device 50 includes an acoustic signal acquisition unit 51 that acquires the acoustic signal AS from the sound source SC, and a storage unit 52 that stores the acoustic signal AS and various kinds of data.

In this embodiment, the control device 50 includes a signal decomposition unit 53 that decomposes the acoustic signal AS. In this embodiment, the signal decomposition unit 53 includes a low sound range component extraction unit 53A and a medium to high sound range component extraction unit 53B. The low sound range component extraction unit 53A extracts a low sound range component corresponding to a low frequency component in the acoustic signal AS. The medium to high sound range component extraction unit 53B extracts a medium to high sound range component corresponding to a frequency component higher than at least the low frequency component in the acoustic signal AS.

For example, in this description, the low frequency component means a signal component in a frequency band of 200 Hz or lower in the acoustic signal AS, and the high frequency component means a signal component in a frequency band of 1 kHz or higher in the acoustic signal AS. Further, a signal component in a middle of these frequency bands is referred to as a medium frequency component.

For example, the low sound range component extraction unit 53A includes a low-pass filter (LPF) that attenuates a signal component having a predetermined frequency or higher (for example, 500 Hz or higher), and extracts a component of the acoustic signal AS including at least the low frequency component. Further, the medium to high sound range component extraction unit 53B includes a high-pass filter (HPF) that attenuates a signal component having a predetermined frequency or lower (for example, 200 Hz or lower), and extracts a component of the acoustic signal AS including at least the high frequency component.

In this embodiment, the control device 50 includes a drive unit 54 that drives the sound output device 30 and the vibration device 40 according to each component of the acoustic signal AS decomposed by the signal decomposition unit 53. The drive unit 54 includes a characteristic adjustment unit 54A that adjusts a characteristic of each frequency component of the acoustic signal AS, and a timing adjustment unit 54B that adjusts a drive timing of the sound output device 30 and the vibration device 40.

For example, the characteristic adjustment unit 54A includes a signal processing circuit that performs various kinds of processes correcting the sound field for the acoustic signal AS, and an equalizer circuit that performs an equalizing process for the low frequency component (low sound range component) of the acoustic signal AS. Further, for example, the timing adjustment unit 54B includes a delay circuit.

Further, in this embodiment, the drive unit 54 includes a drive signal generating unit 54C that generates a drive signal for driving the sound output device 30 and the vibration device 40, so as to perform sound output and vibration in response to the acoustic signal AS, which is decomposed by the signal decomposition unit 53 and adjusted variously by the characteristic adjustment unit 54A, and its respective components.

In this embodiment, the drive signal generating unit 54C generates a first speaker drive signal S1 that drives the center speaker 31 to cause the center speaker 31 to perform the sound output, and a second speaker drive signal S2 that drives the headrest speaker 32 to cause the headrest speaker 32 to perform the sound output. The drive signal generating unit 54C includes, for example, a voltage generating circuit that generates a driving voltage to drive the sound output device 30 and an amplifier circuit.

Further, in this embodiment, the drive signal generating unit 54C generates a first vibration drive signal V1 that drives the seat portion vibration unit 41 to vibrate the seat portion vibration unit 41, and a second vibration drive signal V2 that drives the back portion vibration unit 42 to vibrate the back portion vibration unit 42. The drive signal generating unit 54C generates, for example, a driving voltage that vibrates the vibration device 40.

The center speaker 31 performs the sound output in response to the acoustic signal AS with the first speaker drive signal S1. For example, the center speaker 31 is a speaker that is arranged ahead of the object person OB seated on the seat 20 and outputs a high-pitched sound that has a great influence on sound image localization. For example, as the center speaker 31, a narrow directional speaker, such as a parametric speaker, can be used to reduce sound leakage to a periphery.

In this embodiment, the first speaker drive signal S1 is a drive signal that drives the center speaker 31 to output the sound in response to the high frequency component of the acoustic signal AS decomposed by the signal decomposition unit 53.

The headrest speaker 32 performs the sound output in response to the acoustic signal AS with the second speaker drive signal S2. For example, the headrest speaker 32 is a speaker that is arranged near the head HD of the object person OB seated on the seat 20 and mainly outputs a medium-pitched sound. In this embodiment, the second speaker drive signal S2 is a drive signal that drives the headrest speaker 32 to output the sound in response to the medium frequency component of the acoustic signal AS.

Further, the seat portion vibration unit 41 and the back portion vibration unit 42 vibrate in response to the acoustic signal AS by the first and second vibration drive signals V1 and V2, respectively. In this embodiment, the first and second vibration drive signals V1 and V2 are drive signals for driving the seat portion vibration unit 41 and the back portion vibration unit 42, respectively so as to vibrate the first and second contact portions 21S and 22S in response to the low frequency component of the acoustic signal AS.

Note that the drive signal generating unit 54C may generate a drive signal responding to both the medium frequency component and the high frequency component of the acoustic signal AS decomposed by the signal decomposition unit 53 as the first speaker drive signal S1. Further, the drive signal generating unit 54C may generate a drive signal responding to both the medium frequency component and the high frequency component of the acoustic signal AS decomposed by the signal decomposition unit 53 as the second speaker drive signal S2. In this case, for example, each of the center speaker 31 and the headrest speaker 32 outputs both the medium-pitched and the high-pitched sounds.

Thus, in this embodiment, the drive unit 54 supplies the drive signals S1, S2, V1 and V2 in which various kinds of characteristics and timings are adjusted based on the acoustic signal AS to the sound output device 30 and the vibration device 40.

Note that in the following, the first vibration drive signal V1 is referred to as a first drive signal, and the second vibration drive signal V2 is referred to as a second drive signal in some cases. Further, the whole of the first and second speaker drive signals S1 and S2 is referred to as a third drive signal in some cases.

The control device 50, in this way, drives and controls the sound output device 30 and the vibration device 40 based on the acoustic signal AS. Note that the storage unit 52 of the control device 50 stores the acoustic signal AS, as well as a decomposition condition of the acoustic signal AS by the signal decomposition unit 53 and a signal component after the decomposition, an adjustment condition of the acoustic signal AS by the characteristic adjustment unit 54A and a signal component after the adjustment, and the like. Further, the storage unit 52 can acquire and store the acoustic signal AS, that is, the acoustic signal acquired from the sound source SC, as well as a signal and data to express various kinds of sound.

Figure 4A:
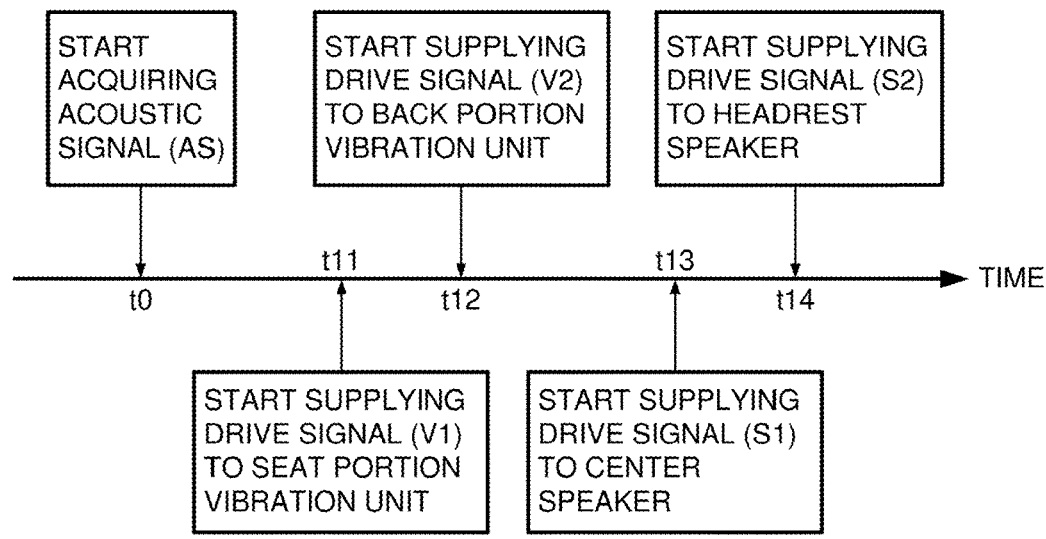
FIG. 4A is a timing chart that illustrates an aspect of vibration control in the acoustic system according to Embodiment 1.

FIG. 4A is a timing chart that illustrates an aspect of supplying the drive signal to the sound output device 30 and the vibration device 40 by the drive unit 54. As illustrated in FIG. 4A, in this embodiment, after acquiring the acoustic signal AS (timing t0), the drive unit 54 supplies the first vibration drive signal V1 responding to the acoustic signal AS acquired at the timing t0 to the seat portion vibration unit 41 at a timing t11. Next, the drive unit 54 supplies the second vibration drive signal V2 responding to the acoustic signal AS acquired at the timing t0 to the back portion vibration unit 42 at a timing t12.

In other words, in this embodiment, the drive unit 54 delays the second vibration drive signal V2 from the first vibration drive signal V1 when supplying the first and second vibration drive signals V1 and V2 responding to the same acoustic signal AS acquired at the timing t0 to the seat portion vibration unit 41 and the back portion vibration unit 42, respectively.

In this embodiment, the low sound range component extraction unit 53A of the signal decomposition unit 53 of the control device 50 extracts the low frequency component of the acoustic signal AS and duplicates the low frequency component into two. Further, the timing adjustment unit 54B of the drive unit 54 adjusts the acoustic signal AS in a manner that delays one of the two low frequency components of the acoustic signal AS from the other. The drive signal generating unit 54C generates the respective first and second vibration drive signals V1 and V2 in a manner to respond to the two low frequency components of this acoustic signal AS in which the timing is adjusted to supply them to the seat portion vibration unit 41 and the back portion vibration unit 42.

Note that the drive unit 54 is not limited to a configuration in which the timings of generating the first and second vibration drive signals V1 and V2 are adjusted when they are generated. The drive unit 54 may adjust the timings when the first and second vibration drive signals V1 and V2 are supplied to the seat portion vibration unit 41 and the back portion vibration unit 42 after being generated separately by the drive signal generating unit 54C.

Further, in this embodiment, the drive unit 54 supplies the first speaker drive signal S1 responding to the acoustic signal AS acquired at the timing t0 to the center speaker 31 at a timing t13 that is a timing after the second vibration drive signal V2 is supplied to the back portion vibration unit 42 (timing t12). Subsequently, the drive unit 54 supplies the second speaker drive signal S2 responding to the acoustic signal AS acquired at the timing t0 to the headrest speaker 32 at a timing t14.

In other words, in this embodiment, when supplying the first and second speaker drive signals S1 and S2 responding to the same acoustic signal AS acquired at the timing t0 to the center speaker 31 and the headrest speaker 32, respectively, the drive unit 54 delays the first speaker drive signal S1 from the second vibration drive signal V2, and delays the second speaker drive signal S2 from the first speaker drive signal S1.

Thus, while delaying the first vibration drive signal V1, the second vibration drive signal V2, the first speaker drive signal S1, and the second speaker drive signal S2 sequentially in this order, the drive unit 54 supplies them to the seat portion vibration unit 41, the back portion vibration unit 42, the center speaker 31, and the headrest speaker 32, respectively.

Figure 4B:
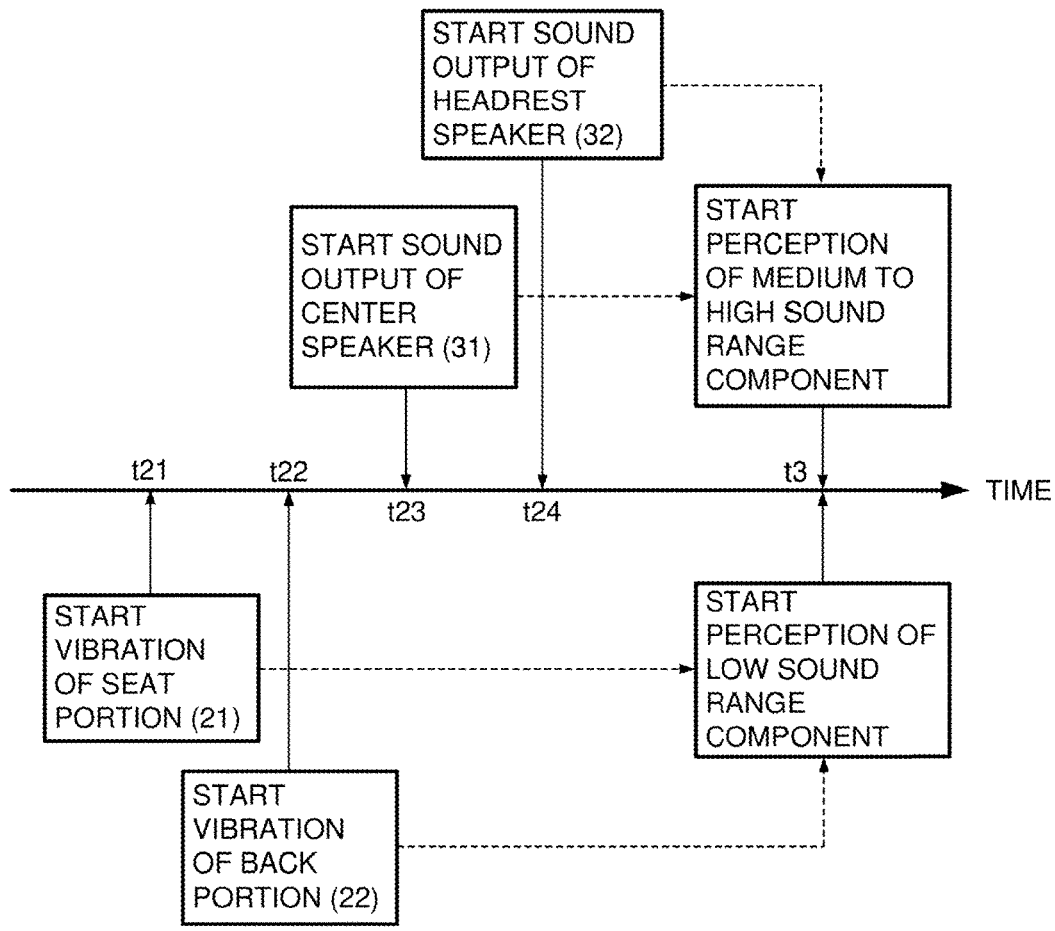
FIG. 4B is a timing chart that illustrates an aspect of vibration control in the acoustic system according to Embodiment 1.

FIG. 4B is a timing chart that illustrates an aspect of the sound output operation by the sound output device 30 and an aspect of a vibration transmission operation by the vibration device 40. As illustrated in FIG. 4B, in this embodiment, first, the seat portion vibration unit 41, which has received the first vibration drive signal V1 from the drive unit 54, starts vibration. Therefore, first, the surface (first contact portion) 21S of the seat portion 21 in the seat 20 vibrates in response to the low frequency component of the acoustic signal AS (timing t21).

Subsequently, by vibration of the back portion vibration unit 42, which has received the second vibration drive signal V2, the surface (second contact portion 22S) of the back portion 22 in the seat 20 vibrates in response to the low frequency component of the acoustic signal AS (timing t22).

Next, the center speaker 31 performs the sound output in response to the high frequency component of the acoustic signal AS (timing t23), and next, the headrest speaker 32 performs the sound output in response to the medium frequency component of the acoustic signal AS (timing t24).

In other words, in the acoustic system 10, when the acoustic signal AS (that is, for example, music) is played, the vibration of the seat portion 21 of the seat 20, the vibration of the back portion 22 of the seat 20, the sound output of the center speaker 31, and the sound output of the headrest speaker 32 are performed in this order. This allows the object person OB seated on the seat 20 to simultaneously perceive these four operations at a timing t3.

Specifically, both a perception of the sound output from the sound output device 30 and the vibration by the vibration device 40 are perceived as an auditory sense and a tactile sense, respectively by reaching a brain (that is, the head HD of the object person OB, see FIG. 2). Further, the sound (sound wave) output from the sound output device 30 is propagated in air to reach ears of the head HD and reaches the brain as a stimulus received by eardrums. On the other hand, the vibrations generated by the vibration device 40 are transmitted via nerves in the body as stimuluses felt by parts of the body that receives the vibration and reaches the brain.

That is, a transmission time of the vibration and a transmission time of the sound to the head HD differ depending on their transmission media, distances, and the like. In the acoustic system 10, sound output timings of the sound output device 30 and vibration timings of the vibration device 40 are adjusted such that the sounds and the vibrations simultaneously reach the head HD of the object person OB.

As illustrated in FIG. 4B, since the acoustic system 10 is configured such that the sound output operation by the sound output device 30 is delayed from the vibration operation by the vibration device 40, the vibrations by the vibration device 40 reach the head HD of the object person OB simultaneously with the sounds by the sound output device 30 to be perceived.

In this embodiment, the sounds output from the center speaker 31 and the headrest speaker 32 is perceived as a medium to high sound range component of music at the timing t3. Further, the vibrations by the vibration device 40 can be perceived as a low sound range component of the music at the timing t3. That is, the vibration device 40 plays a part of a music playback device together with the sound output device 30.

Further, the back portion vibration unit 42 of the vibration device 40 transmits a vibration to the second part BP2 that has a shorter distance from the head HD than that of the first part BP1 of the object person OB to which the seat portion vibration unit 41 transmits vibration. Therefore, as illustrated in FIG. 4B, by delaying the vibration operation of the back portion vibration unit 42 from the vibration operation of the seat portion vibration unit 41, the vibrations transmitted from both can be simultaneously perceived by the object person OB at the timing t3.

The same applies to the sound output timing of the center speaker 31 and the headrest speaker 32 of the sound output device 30. Therefore, a high-quality and realistic sound can be provided by the sounds and the vibrations.

Figure 5:
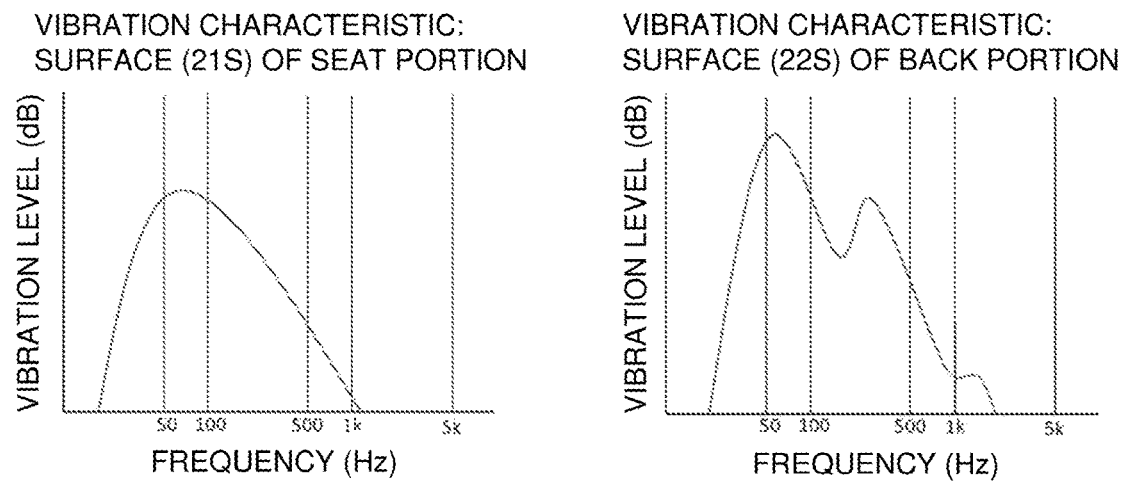
FIG. 5 is a drawing illustrating vibration characteristics of each of the vibration units in the acoustic system according to Embodiment 1.

FIG. 5 is a diagram showing aspects of adjustment of the first and second vibration drive signals V1 and V2 by the drive unit 54 of the control device 50. Specifically, FIG. 5 shows vibration levels of the surface 21S of the seat portion 21 and the surface 22S of the back portion 22 when the acoustic signal acquisition unit 51 acquires the acoustic signal AS with a frequency changed while an amplitude is constant. In this embodiment, in order to achieve the vibration-frequency characteristics as shown in FIG. 5, the drive unit 54 is configured to adjust vibration characteristics of each of the seat portion vibration unit 41 and the back portion vibration unit 42.

In this embodiment, the characteristic adjustment unit 54A of the drive unit 54 is configured to allow adjusting the frequency characteristics for the respective two low frequency components of the acoustic signal AS that become the first and second vibration drive signals V1 and V2. That is, the drive unit 54 is configured to allow adjusting the frequency characteristics individually for each of the first and second vibration drive signals V1 and V2.

Further, in this embodiment, the drive unit 54 is configured to allow having the mutually different frequency characteristics for the first and second vibration drive signals V1 and V2. First, the drive unit 54 adjusts the frequency characteristics of the first and second vibration drive signals V1 and V2 so as to vibrate the surface 21S of the seat portion 21 of the seat 20 and the surface 22S of the back portion 22, for example, with the respective characteristics shown in FIG. 5.

For example, in this embodiment, the maximum vibration level of the surface 21S of the seat portion 21 is adjusted to be smaller than the maximum vibration level of the surface 22S of the back portion 22. This allows the vibration of the seat portion 21 to effectively provide a feeling of being pushed up or attacked to the buttocks of the object person OB, and the vibration of the back portion 22 to effectively provide a feeling of being wrapped to the back of the object person OB. Further, in the back portion 22, the vibration is adjusted to be smaller than the vibration level of frequency bands of its both sides within the range of 100 to 200 Hz. This can suppress providing tickling sensation to the back of the object person OB.

Note that the aspects of adjustment of the frequency characteristics of the first and second vibration drive signals V1 and V2 shown in FIG. 5 and the aspect of adjustment of the vibration characteristics of the vibration device 40 based on them are merely examples. For example, it is only necessary for the drive unit 54 to be configured to allow adjusting the frequency characteristics for each of the first and second vibration drive signals V1 and V2.

Figure 6:
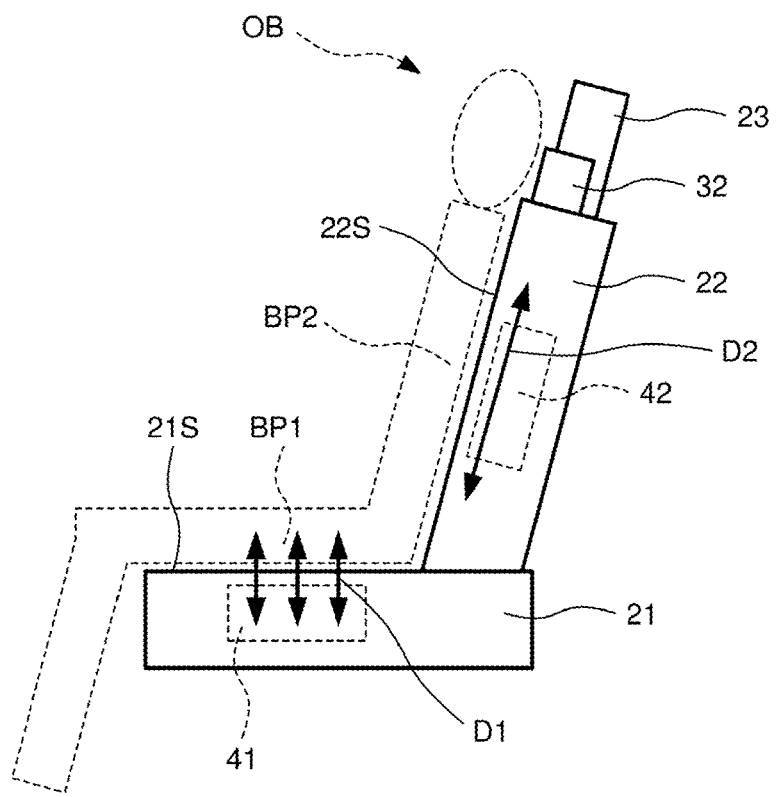
FIG. 6 is a drawing illustrating vibration characteristics of each of the vibration units in the acoustic system according to Embodiment 1.

FIG. 6 is a diagram illustrating a preferable configuration of the seat portion vibration unit 41 and the back portion vibration unit 42. As illustrated in FIG. 6, in this embodiment, the seat portion vibration unit 41 vibrates so as to transmit the vibration in a direction D1 heading from the surface (first contact portion) 21S of the seat portion 21 of the seat 20 toward the first part BP1 of the object person OB to a surface 21S of the seat portion 21. Further, in this embodiment, the back portion vibration unit 42 vibrates so as to transmit the vibration in a direction D2 along the surface (second contact portion) 22S of the back portion 22 of the seat 20 to the surface 22S of the back portion 22.

This improves dramatic effect that the vibration of the seat portion 21 and the vibration of the back portion 22 provide. Specifically, in the seat portion vibration unit 41, by providing a vibration that pushes the buttocks of the object person OB, a feeling of being pushed up or attacked can be provided to the object person OB. Further, in the back portion vibration unit 42, by providing a vibration along a surface of the back of the object person OB, a feeling of being wrapped can be provided to the object person OB.

Note that the aspect of vibration of the seat portion vibration unit 41 and the back portion vibration unit 42 illustrated in FIG. 6 is a merely example. For example, for the seat portion vibration unit 41 and the back portion vibration unit 42, it is only necessary to set respective vibration directions appropriately.

As described above, the acoustic system 10 considers differences in perceptional paths and perceptional timings to the object person OB between the sound and the vibration and performs the sound output and the vibration while optimizing these. Therefore, the high-quality and realistic sound can be provided.

Note that, as illustrated in FIG. 4A, this embodiment has described the case where the first and second vibration drive signals V1 and V2 are supplied to the seat portion vibration unit 41 and the back portion vibration unit 42 while the second vibration drive signal V2 is delayed from the first vibration drive signal V1. However, the supply timings of the first and second vibration drive signals V1 and V2 are not limited thereto.

For example, the seat portion 21 and the back portion 22 of the seat 20 are configured of mutually different materials (such as a cushion material and a cover material) in some cases. In this case, a period from when the seat portion vibration unit 41 starts vibration to when the surface 21S of the seat portion 21 of the seat 20 starts vibration and a period from when the back portion vibration unit 42 starts vibration to when the surface 22S of the back portion 22 of the seat 20 starts vibration are mutually different in some cases.

Therefore, in this case, for example, the first and second vibration drive signals V1 and V2 may be supplied simultaneously to the seat portion vibration unit 41 and the back portion vibration unit 42, respectively. In other words, it is only necessary for the seat portion vibration unit 41 and the back portion vibration unit 42 to vibrate such that the surface 22S of the back portion 22 of the seat 20 vibrates with a delay from the surface 21S of the seat portion 21 of the seat 20.

Further, this embodiment has described the case where the acoustic system 10 is configured to provide the sound to the object person OB seated on the seat 20. However, the acoustic system 10 can provide the high-quality sound to various kinds of object person OB. For example, similar effect can be obtained by embedding the vibration device 40 in a bed instead of the seat 20 and arranging the sound output device 30 around the bed.

Further, the sound output device 30 may be a portable sound output device, such as headphones, instead of the center speaker 31 and the headrest speaker 32. In this case, for example, the vibration device 40 may be configured to have a configuration that is portable with the headphones and to be arrangeable in various kinds of chair and various kinds of position of the bed.

Further, this embodiment has described the case where the vibration device 40 includes the seat portion vibration unit 41 that transmits the vibration to the buttocks or thighs of the object person OB and the back portion vibration unit 42 that transmits the vibration to the back or waist that is closer to the head HD than the buttocks or thighs. That is, the case where the first part BP1 is the buttocks or thighs of the object person OB and the second part BP2 is the back or waist of the object person OB has been described. However, it is only necessary for the vibration device 40 to include a plurality of vibration units, and the respective vibration units only need to be configured to transmit the vibration to mutually different parts of the body of the object person OB.

In other words, for an object (for example, the seat 20) that has the first contact portion 21S in contact with the first part BP1 of the body of the object person OB and the second contact portion 22S in contact with the second part BP2 different from the first part BP1 of the body of the object person OB, it is only necessary for the vibration device 40 to include the first vibration unit (for example, the seat portion vibration unit 41) that vibrates so as to vibrate the first contact portion 21S and the second vibration unit (for example, the back portion vibration unit 42) that vibrates so as to vibrate the second contact portion 22S.

For example, even if the distances from the head HD to the two target parts to which the vibrations are provided are about the same, transmission distances and transmission paths to the head HD are different in some cases. Therefore, for example, by delaying the vibration of the vibration unit that provides the vibration to the part, among the two body parts, having a shorter vibration transmission time to the head HD, the high-quality sound (for example, low pitch sound part) can be perceived by the object person OB.

Further, this embodiment has described the case where the acoustic system 10 is configured to express the low pitch sound part of the sound by the vibration device 40 and express the medium to high pitch sound part by the sound output device 30. However, the acoustic system 10 does not have to include the sound output device 30. For example, it is only necessary for the acoustic system 10 to include the vibration device 40.

In this case, for example, it is only necessary for the vibration device 40 and the control device 50 to constitute a vibration system that performs acoustic expression and have a configuration that can be connected to the sound output device 30. In this case, for example, it is only necessary for the vibration device 40 to express the low sound range (low frequency component of the acoustic signal AS), and supply a drive signal for driving an external sound output device (such as, a speaker system or headphones) that expresses another sound range.

In this case, for example, it is only necessary for the drive unit 54 to generate the third drive signal (for example, the first and second speaker drive signals S1 and S2) that drives the sound output device performing sound output in response to the frequency component higher than at least the low frequency component, such as the sound output device 30, and supply the third drive signal to the sound output device while delaying the third drive signal from the second vibration drive signal V2.

Further, this embodiment has described the case where the operations of the sound output device 30 and the vibration device 40 are controlled by the control device 50. However, each of the sound output device 30 and the vibration device 40 may have the respective functions of the control device 50. That is, for example, the vibration device 40 may be configured to acquire the acoustic signal AS and conduct the characteristics adjustment and timing adjustment, while transmitting the vibration to the object person OB by the seat portion vibration unit 41 (first vibration unit) and the back portion vibration unit 42 (second vibration unit).

As described above, for the object (20) that includes the first contact portion 21S in contact with the first part BP1 of the body of the object person OB and the second contact portion 22S in contact with the second part BP2 different from the first part BP1 of the body of the object person OB, the vibration device 40 includes the first vibration unit 41 that vibrates so as to vibrate the first contact portion 21S and the second vibration unit 42 that vibrates so as to vibrate the second contact portion 22S. Further, the first and second vibration units 41 and 42 vibrate such that the first and second contact portions 21S and 22S respectively vibrates in response to the acoustic signal AS, and the second contact portion 22S vibrates with a delay from the first contact portion 21S. Therefore, the vibration device 40 capable of providing the high-quality and realistic sound can be provided.

Further, the present invention can also be implemented as, for example, a driving method for the vibration device 40. In this case, for example, a requirement of the method includes a function of the control device 50. For example, for the object (20) that includes the first contact portion 21S in contact with the first part BP1 of the body of the object person OB and the second contact portion 22S in contact with the second part BP2 different from the first part BP1 of the body of the object person OB, it is only necessary for the method to be a driving method for the vibration device 40 that includes the first vibration unit 41 that vibrates the first contact portion 21S and the second vibration unit 42 that vibrates the second contact portion 22S and to include a step of driving the first and second vibration units 41 and 42 such that each of the first and second contact portions 21S and 22S vibrates in response to the acoustic signal AS and the second contact portion 22S vibrates with a delay from the first contact portion 21S. Therefore, the driving method of the vibration device 40 capable of providing the high-quality and realistic sound can be provided.

Further, the present invention can also be implemented as a program that causes a computer to function as the drive unit 54 of the vibration device 40. In this case, for example, an operation requirement of the program includes a function of the control device 50. For example, the program only needs to be configured to cause the computer to function as the drive unit 54, which drives the first vibration unit 41 that vibrates the first contact portion 21S and the second vibration unit 42 that vibrates the second contact portion 22S of the object (20), such that each of the first and second contact portions 21S and 22S vibrates in response to the acoustic signal AS and the second contact portion 22S vibrates with a delay from the first contact portion 21S. The object (20) includes the first contact portion 21S in contact with the first part BP1 of the body of the object person OB and the second contact portion 22S in contact with the second part BP2 different from the first part BP1 of the body of the object person OB.

Further, the present invention can also be implemented as a recording medium that records the program. This allows providing the control program of the vibration device 40 capable of providing the high-quality and realistic sound and the recording medium that records the program.

Embodiment 2

Figure 7A:
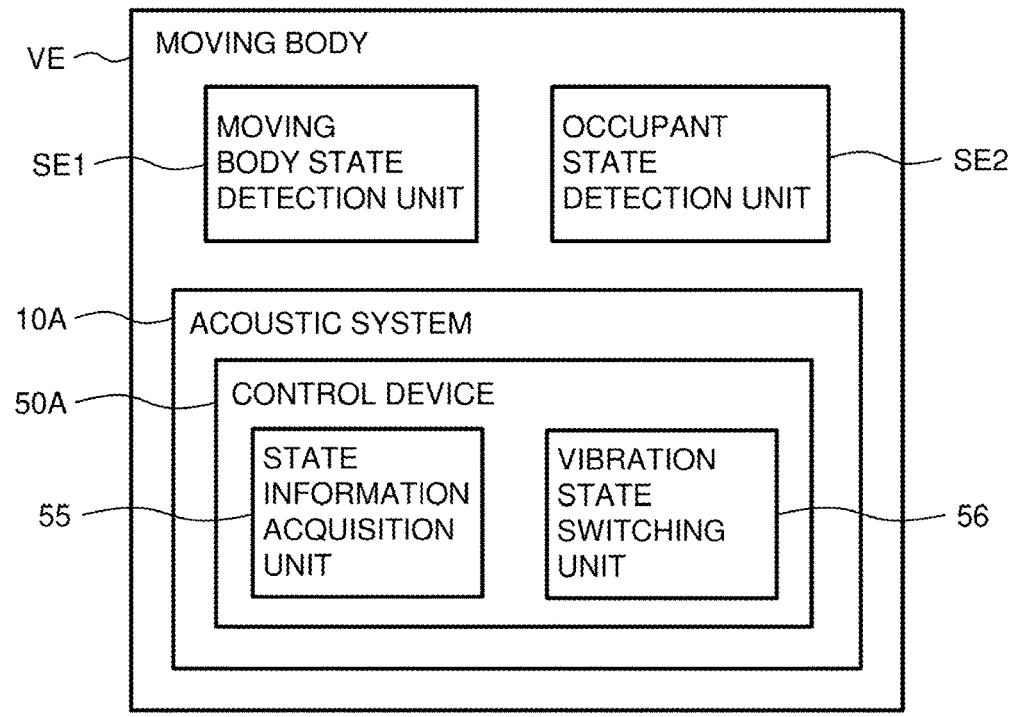
FIG. 7A is a partial block diagram of an acoustic system according to Embodiment 2.

FIG. 7A is a block diagram illustrating a partial configuration of an acoustic system 10A according to Embodiment 2. In FIG. 7A, only blocks added to the acoustic system 10 in the acoustic system 10A are illustrated. Further, in FIG. 7A, the block diagram illustrating a configuration of a moving body VE on which the acoustic system 10A is mounted is illustrated.

First, in this embodiment, the acoustic system 10A is mounted on the moving body VE and performs acoustic output to an occupant of the moving body VE. That is, in this embodiment, the seat 20 in the acoustic system 10A is a seat configured as a seat of the moving body VE. Further, the object person OB is the occupant of the moving body VE. Further, in this embodiment, for example, the moving body VE is provided with a plurality of the seats 20, and the acoustic system 10A independently performs the acoustic output to the occupants seated in the respective plurality of seats 20.

Further, in this embodiment, the acoustic system 10A has the same configuration as the acoustic system 10 except for the configuration of the control device 50. A control device 50A is configured to change an aspect of vibration of the vibration device 40 according to a state and the like of the moving body VE.

Specifically, first, for example, the moving body VE includes a moving body state detection unit SE1 and an occupant state detection unit SE2. The moving body state detection unit SE1 detects various states of the moving body VE (such as, moving speed and its change, moving direction and its change, and surrounding environment of the moving body VE). The occupant state detection unit SE2 detects various states of the occupant of the moving body VE (such as, change in visual line, change in body position, and change in heart rate and brain wave). Note that the moving body state detection unit SE1 and the occupant state detection unit SE2 may be disposed outside the moving body VE, or may be disposed in the acoustic system 10A.

Next, the control device 50A of the acoustic system 10A includes a state information acquisition unit 55 and a vibration state switching unit 56. The state information acquisition unit 55 acquires state information that is a piece of information indicating states of the moving body VE and the occupant (object person OB) of the moving body VE. The vibration state switching unit 56 switches the aspect of vibration of the vibration device 40 based on the state information.

Figure 7B:
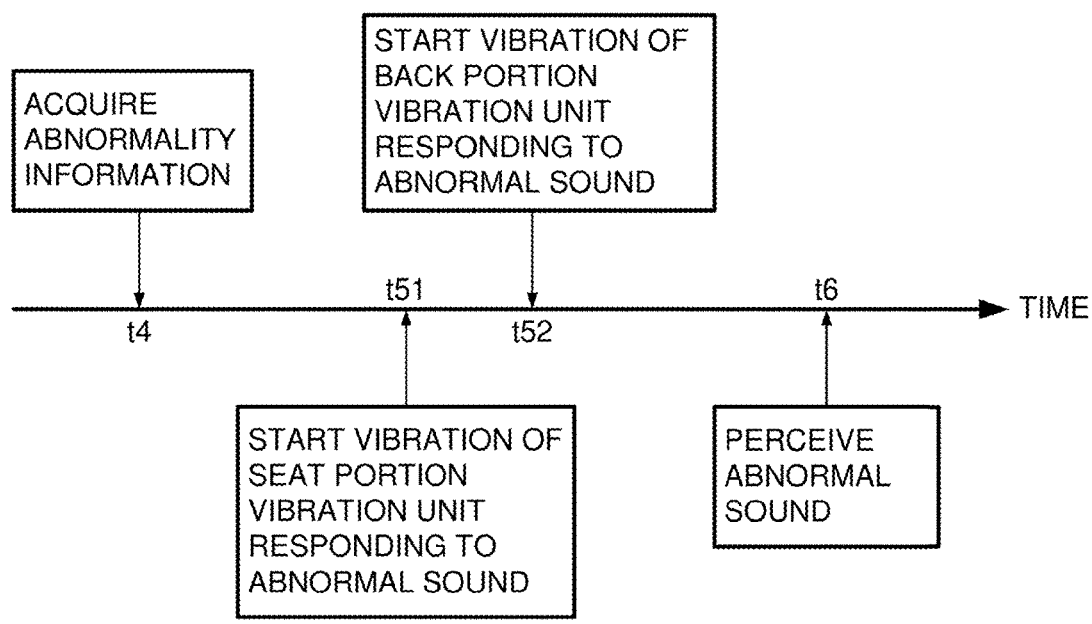
FIG. 7B is a timing chart that illustrates an aspect of vibration control in the acoustic system according to Embodiment 2.

FIG. 7B is a diagram illustrating an aspect of switching of the vibration state of the vibration device 40 when abnormality information is acquired. The abnormality information is a piece of information indicating that the moving body VE or its occupant is in an abnormal state (for example, being in an abnormal driving state, a driver being in a drowsy driving state, and the like). FIG. 7B is a timing chart illustrating an operation after the acoustic system 10A acquires the abnormality information.

As illustrated in FIG. 7B, after the state information acquisition unit 55 of the control device 50A acquires the abnormality information (timing t4), the vibration state switching unit 56 starts a vibration responding to an abnormal sound that is a sound indicating the abnormality information to the vibration device 40. The drive unit 54 generates the first and second vibration drive signals V1 and V2 to conduct the vibration responding to the abnormal sound from the storage unit 52. Further, the drive unit 54 supplies the first and second vibration drive signals V1 and V2 to the seat portion vibration unit 41 and the back portion vibration unit 42, respectively while delaying the second vibration drive signal V2 from the first vibration drive signal V1.

Note that the abnormal sound may differ depending on types of the abnormality information. For example, the storage unit 52 may store data relating to a plurality of abnormal sounds. Then, the vibration state switching unit 56 may, for example, operate the drive unit 54 to vibrate the vibration device 40 in response to the different abnormal sounds according to the types of the abnormality information.

This causes the seat portion vibration unit 41 to start the vibration responding to the abnormal sound at a timing t51.

Further, next, the back portion vibration unit 42 starts the vibration responding to the abnormal sound at a timing t52. This causes the occupant of the moving body VE as the object person OB to perceive the abnormal sound at a timing t6 and perceive that the moving body VE or the occupant is in an abnormal state.

Accordingly, in this embodiment, the control device 50A is configured such that when the moving body VE or the occupant is in an abnormal state, the vibration device 40 conducts the vibration responding to the sound indicating the abnormality. Therefore, for example, using the seat portion vibration unit 41 and the back portion vibration unit 42, the abnormality information can be surely notified to the occupant.

Further, for example as a vehicle, when the vibration device 40 is mounted on each of a plurality of seats, the abnormality information can be notified only to a specific occupant. For example, the abnormality of the moving body VE can be notified only to the driver, or the abnormality of the driver can be notified to an occupant in the passenger seat. This can help in avoiding, for example, danger of an accident.

Note that when the acoustic system 10A performs acoustic output of, for example, a music composition, the vibration state switching unit 56 may cause the vibration device 40 to stop or reduce the vibration responding to the acoustic signal AS and start the vibration responding to the abnormal sound.

In this case, the drive unit 54 may cause the sound output device 30 to continue the sound output of, for example, the music composition, while causing the vibration device 40 to conduct the vibration responding to the abnormal sound. Therefore, for example, the occupants in the driver seat and the passenger seat can be notified of the abnormality information, while the playback of the music can be maintained for an occupant in a rear seat. Accordingly, the control device 50A can provide the vibration device 40 capable of providing acoustic output and information with a high degree of freedom and safety.

Note that, in this embodiment as well, the function of the control device 50A may be disposed in the vibration device 40. For example, the vibration device 40 may include the state information acquisition unit 55 that acquires the state information that is a piece of information indicating the state of the moving body VE and the occupant of the moving body VE. Further, the first vibration unit (seat portion vibration unit 41) or the second vibration unit (back portion vibration unit 42) may be configured, when the state information acquisition unit 55 acquires information indicating that the moving body VE is in an abnormal moving state or information indicating that the occupant is in an abnormal state as state information, to vibrate the first or second contact portion (the surface 21S of the seat portion 21 or the surface 22S of the back portion 22) in response to the sound associated with the acquired information.

Further, this embodiment has described the case where the acoustic system 10A switches the vibration state of the vibration device 40 according to the state of the moving body VE or the occupant. However, the configuration of the acoustic system 10A is not limited to this. For example, for the vibration device 40, the seat 20 only needs to be configured to be mounted in the moving body VE and seated by the occupant of the moving body VE as the object person OB. This can provide a sound optimized for each occupant in a closed space, such as the moving body VE (for example, a vehicle).

Accordingly, in this embodiment, the seat 20 is configured to be mounted in the moving body VE and seated by the occupant of the moving body VE as the object person OB. Therefore, even in a space having a complicated shape, such as a space in the vehicle, the vibration device 40 can provide a high-quality and realistic acoustic space to the object person OB. Further, by switching the vibration state based on the state and the like of the moving body VE and the occupant, the vibration device 40 can effectively transmit various kinds of information to the object person OB.

REFERENCE SIGNS LIST 10, 10A acoustic systems
20 seat
21 seat portion
22 back portion
40 vibration device
41 seat portion vibration unit
42 back portion vibration unit

The invention claimed is:

1. A vibration device comprising:
an acquisition unit that acquires an electric signal indicating a sound that is reproduced by a sound source device;
a first vibration unit that vibrates to vibrate a first contact portion which is in contact with a first part of a body of an object person; and
a second vibration unit that vibrates to vibrate a second contact portion which is in contact with a second part of the body of the object person, the second pan being closer to a head of the object person than the first part, wherein
each of the first vibration unit and the second vibration unit vibrates in response to the electric signal such that the second contact portion vibrates with a delay from the first contact portion.

2. The vibration device according to claim 1, wherein each of the first vibration unit and the second vibration unit vibrates such that stimulation by vibration of the first contact portion and stimulation by vibration of the second contact portion are simultaneously perceived by the object person.

3. The vibration device according to claim 1, wherein the first part is a buttock or a thigh of the object person, and
the second part is a back or a waist of the object person.

4. The vibration device according to claim 1, wherein the first contact portion is a surface of a seat portion of a seat which the object person is seated, and the second contact portion is a surface of a backrest portion of the seat.

5. The vibration device according to claim 1, further comprising
a drive unit that drives the first vibration unit and the second vibration unit, wherein
the drive unit generates individually first drive signal and second drive signal that respectively drive the first vibration unit and the second vibration unit based on the electric signal, and respectively supplies the first drive signal and the second drive signal to the first vibration unit and the second vibration unit while delaying the second drive signal from the first drive signal.

6. The vibration device according to claim 5 wherein the first vibration unit and the second vibration unit respectively vibrate the first contact portion and the second contact portion in response to a low frequency component of the electric signal, and
the drive unit generates a third drive signal that drives a sound output device that performs a sound output in response to a frequency component higher than at least the low frequency component of the electric signal, and supplies the third drive signal to the sound output device while delaying the third drive signal from the second drive signal.

7. The vibration device according to claim 5, wherein the drive unit is configured to allow adjusting a frequency characteristic to each of the first signal and second drive signal.

8. The vibration device according to claim 1, wherein the first vibration unit vibrates the first contact portion in a direction heading from the first contact portion toward the first part, and
the second vibration unit vibrates the second contact portion in a direction along a surface of the second contact portion.

9. The vibration device according to claim 8, wherein the seat is a seat mounted in a moving body and configured to be seated on by an occupant of the moving body as foe object person.

10. The vibration device according to claim 9, further comprising:
a state information acquisition unit that acquires state information that is information indicating a state of the moving body and the occupant of the moving body, wherein
when the state information acquisition unit acquires information indicating that the moving body is in an abnormal moving state or information indicating that the occupant is in an abnormal state as the state information, the first vibration unit or the second vibration unit vibrates the first contact portion or the second contact portion in response to a sound associated with the acquired information.

11. The vibration device according to claim 1, wherein the first vibration unit vibrates in response to a first drive signal and the second vibration unit vibrates in response to a second drive signal, wherein the first drive signal and the second drive signal are generated based on the electric signal indicating the sound and a phase of the second drive signal is behind a phase of the first drive signal such that the second contact portion vibrates with a phase delay from the first contact portion.

12. A driving method for a vibration device, wherein
the vibration device includes a first vibration unit and a second vibration unit, the first vibration unit vibrating a first contact portion being in contact with a first part of a body of an object person, the second vibration unit vibrating a second contact portion being in contact with a second part of the body of the object person, the second part being closer to a head of the object person than the first part, the method comprising
an acquisition unit acquiring an electric signal indicating a sound that is reproduced by a sound source device,
each of the first vibration unit and the second vibration unit vibrating in response to the electric signal such that the second contact portion vibrating with a delay from the first contact portion.

13. A program that causes a computer to function as a drive unit, wherein
the drive unit drives such that each of a first vibration unit and a second vibration unit vibrates in response to an electric signal indicating a sound that is reproduced by a sound source device such that a second contact portion vibrates with a delay from a first contact portion, the first vibration unit provides a vibration to the first contact portion which is in contact with a first part of a body of an object person and the second vibration unit provides a vibration to the second contact portion which is in contact with a second part of the body of the object person, the second part being closer to a head of the object person than the first part.

14. A recording medium that records the program according to claim 13.

* * * * *